Feb. 25, 1958　　　　M. PANICH　　　　2,824,747
DEVICE FOR IMPROVING THE TRACTION OF VEHICLES
Filed Dec. 14, 1954

Inventor
Marcos Panich,
by Hall & Houghton
Attorney.

United States Patent Office 2,824,747
Patented Feb. 25, 1958

2,824,747

DEVICE FOR IMPROVING THE TRACTION OF VEHICLES

Marcos Panich, Buenos Aires, Argentina

Application December 14, 1954, Serial No. 475,160

2 Claims. (Cl. 280—29)

The present invention refers to a device for improving the traction of vehicles. The device may also be adapted to other apparatus.

The object of the invention is to reduce the traction force required to move a vehicle. The invention is based on the application of the load to be transported to the inside of the rim of a traction wheel in such a manner that on applying the traction force to the centre of the wheel or to the upper half of the rim thereof, a leverage effect is obtained.

In accordance with the invention, the vehicle is provided with a traction wheel which receives the traction force at its center or on the upper half of the outside or inside circumference of the rim thereof, means being provided to support the load to be transported on the inside circumference of the rim of the traction wheel and means are provided to produce a leverage effect which is transmitted to the load supporting means tending to cause the latter to be displaced in the direction of advance of the vehicle.

The load supporting means may be constituted by a frame supporting the load and having a load supporting roller or other suitable means adapted to contact the inner circumference of the rim of the traction wheel. An arm fixed to a part of the supporting frame is provided with a roller or other suitable part at its free end, adapted to contact the inside circumference of the rim of the traction wheel, the said arm and roller being designed to transmit a leverage to the load supporting roller.

An embodiment of the invention will now to described by way of example, with reference to the accompanying drawing, in which.

Figure 1:
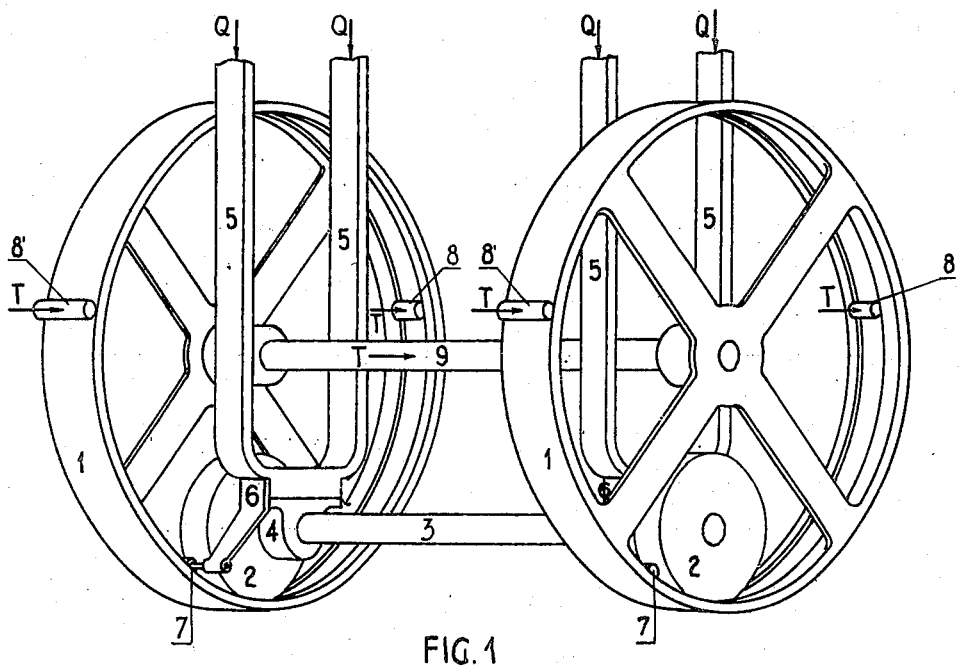
Figure 1 is a view in perspective of the device in accordance with the invention.
Figures 2, 3:
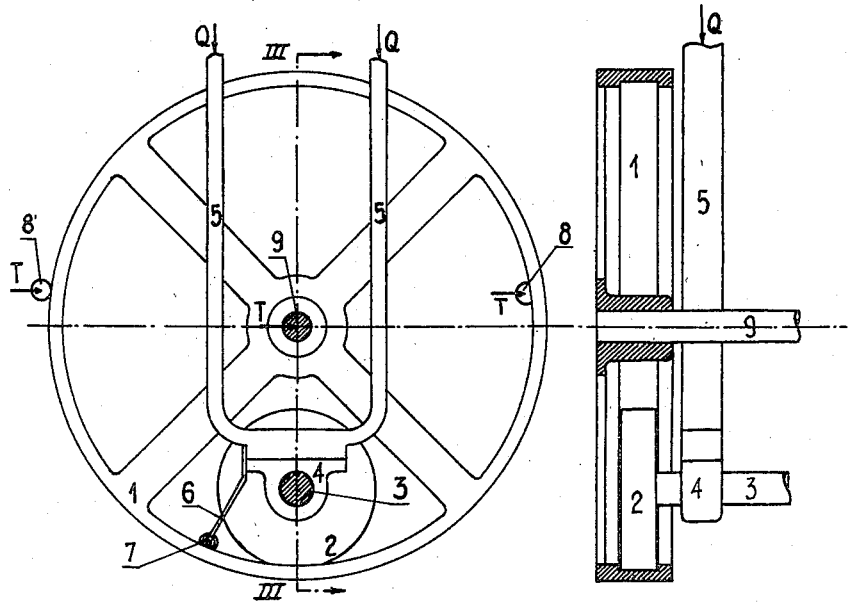
Figure 2 is an elevation of the same seen from the inside of a traction wheel and Figure 3 is a section on the line III—III in Figure 2.

The device as shown in the drawings is composed of a traction wheel 1, with an annular run on the inside circumference to guide the movement of a load supporting roller 2 which is fixed to the shaft 3 and the latter receives by means of the bearings 4, the load Q applied to the supports 5, which may form part of a frame sustaining the load of the vehicle. A bar 6 is rigidly attached to the support 5 and is provided at its free end with a roller 7 or other suitable part which is in contact with the inner circumference of the traction wheel 1. As best shown in Fig. 1, the arm 6 is relatively thin and somewhat like a leaf spring and the roller 7 is also offset from the arm 6. Therefore the force applied against the roller 7 by the flange of wheel 1, as hereinafter described, is somewhat resiliently transmitted to the load supporting frame 4, 5. Since the wheel axle 9 is not journalled in the frame 5 and since the rollers 2 and 7 (all the rollers supporting the load carrying frame 5 relative to the wheel) contact the wheel in a non-stabilizing manner (compare the stabilizing contact of the rollers W with wheel 11 in Daniels, U. S. Patent No. 1,302,638, dated May 6, 1919, for example) the axis of the wheel (axle 9) may move fore-and-aft somewhat relative to the load carrying frame assembly 2, 3, 4, 5, 6, 7, allowing the wheel 1 to start turning and advancing even against a relatively great force retarding forward movement of the load carrying frame assembly 2—7. The load being held back, the turning of the wheel 1 lifts the roller 2, and gravity then acts to cause roller 2 to try to roll down again toward the bottom of the wheel 1, to thus advance the load. In the preferred arrangement shown, however, the greater rise and greater forward component of effort exerted by the more elevated portion of the wheel 1 against the roller 7 is exerted through the arm 6 to urge the frame 2—7 forwardly more quickly than it would otherwise move, thus more readily starting the forward motion of the load, while maintaining the ability of the wheel 1 to start turning ahead of the motion of the load. The traction force T is applied to the wheel 1 by means of rollers 8 or 8' which run on the upper half of the outer or inner circumference of the rim of the traction wheel 1, or the traction force can be applied to the shaft 9 of the said wheel or to the rim thereof by any suitable means.

The traction force being applied for instance at the points 8, 8' or 9 of the traction wheel, the latter will start to roll forward relative to the load supporting frame 4, 5 and transmit the effort to the arm or bar 6 and the latter will in turn transmit it to the load supporting roller 2 forcing it to be displaced on the inner part of the rim of the traction wheel which serves as a rail therefor.

It will be understood that the rim of the wheel may be provided with rubber tires or not, and that the wheels may run on roads or rails. Instead of employing rollers, any suitable combination of gears may be found suitable for producing the required effect and other modifications may be introduced within the scope of the invention. It is obvious also that the device is applicable to a separate wheel or to a group of wheels as may be desired.

Having thus described my invention and the manner in which the same may be put into practice, by way of example, I declare that what I claim is:

1. A device of the class described comprising, in combination, a drivable wheel, load supporting means, roller type means engaging only the lower inner side of said wheel, said load supporting means being supported by said roller type means independently of the axis of said wheel and said wheel thus being free to commence rolling motion along the ground in the direction of travel before said load supporting means is put into motion in said direction of travel, a relatively thin arm extending from said load supporting means, and auxiliary roller means carried by said arm and contacting said wheel at a position peripherally spaced from the bottom of the wheel, said auxiliary roller and arm aiding the force of gravity in urging said load supporting means into motion in the direction of travel when initial rolling motion of said wheel has begun.

2. A device according to claim 1, said auxiliary roller means being offset from said arm for torquing said arm for urging said load supporting means into motion.

References Cited in the file of this patent

UNITED STATES PATENTS

| | | |
|---|---|---|
| 212,235 | Kirchhoffer | Feb. 11, 1879 |
| 1,302,638 | Daniels | May 6, 1919 |
| 1,502,632 | Hasley | July 22, 1924 |
| 1,679,098 | Shahpar | July 31, 1928 |
| 1,819,924 | Seppola | Aug. 18, 1931 |